US012656491B2

(12) United States Patent
Noguchi

(10) Patent No.: US 12,656,491 B2
(45) Date of Patent: Jun. 16, 2026

(54) LIDAR DEVICE, LIDAR SYSTEM, AND MEASUREMENT METHOD USING LIDAR

(71) Applicant: NEC Corporation, Tokyo (JP)

(72) Inventor: Hidemi Noguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1094 days.

(21) Appl. No.: 17/770,091

(22) PCT Filed: Oct. 31, 2019

(86) PCT No.: PCT/JP2019/042888
§ 371 (c)(1),
(2) Date: Apr. 19, 2022

(87) PCT Pub. No.: WO2021/084710
PCT Pub. Date: May 6, 2021

(65) Prior Publication Data
US 2022/0357447 A1      Nov. 10, 2022

(51) Int. Cl.
*G01C 3/08*          (2006.01)
*G01S 7/493*         (2006.01)
*G01S 17/32*         (2020.01)

(52) U.S. Cl.
CPC .............. *G01S 17/32* (2013.01); *G01S 7/493* (2013.01)

(58) Field of Classification Search
CPC .................................. G01S 17/32; G01S 7/493
See application file for complete search history.

(56) References Cited

U.S. PATENT DOCUMENTS

| | | | |
|---|---|---|---|
| 8,098,998 B2 | 1/2012 | Takashima et al. | |
| 2004/0161250 A1 | 8/2004 | Kozlowski et al. | |
| 2010/0119239 A1 | 5/2010 | Wang et al. | |
| 2018/0269981 A1* | 9/2018 | Blauvelt ................ | H04B 10/54 |
| 2020/0200904 A1* | 6/2020 | Singer ................... | B60W 10/04 |
| 2021/0072383 A1 | 3/2021 | Noguchi et al. | |
| 2021/0389459 A1* | 12/2021 | Yoon ....................... | G01S 17/10 |

FOREIGN PATENT DOCUMENTS

| | | |
|---|---|---|
| JP | H05-302977 A | 11/1993 |
| JP | H10-48582 A | 2/1998 |
| JP | 2004-037647 A | 2/2004 |
| JP | 2008-292985 A | 12/2008 |
| JP | 2014-531779 A | 11/2014 |

(Continued)

OTHER PUBLICATIONS

Office Action issued May 9, 2023 in Japanese Application No. 2021-554004.

(Continued)

*Primary Examiner* — Mark Hellner
(74) *Attorney, Agent, or Firm* — Sughrue Mion, PLLC

(57) ABSTRACT

To suppress the deterioration of signal quality in an optical signal, a LiDAR device comprises: a signal output means 20 for outputting a first electric signal in a first period, reducing the amplitude of the first electric signal outside the first period, and then outputting a second electric signal; a modulator 30 which outputs an optical signal modulated on the basis of the first electric signal or the second electric signal; and a control means 40 for applying, to the modulator 30, a bias voltage based on the optical signal modulated on the basis of the first electric signal.

8 Claims, 9 Drawing Sheets

(56)         References Cited

FOREIGN PATENT DOCUMENTS

| | | |
|---|---|---|
| JP | 2017-147622 A | 8/2017 |
| WO | 2019/116549 | 6/2019 |

OTHER PUBLICATIONS

International Search Report for PCT Application No. PCT/JP2019/042888, mailed on Jan. 21, 2020.

English translation of Written opinion for PCT Application No. PCT/JP2019/042888, mailed on Jan. 21, 2020.

JP Office Action for JP Application No. 2021-554004, mailed on Aug. 8, 2023 with English Translation.

1 Extended European Search Report for EP Application No. 19950787.2 dated on Oct. 12, 2022.

* cited by examiner

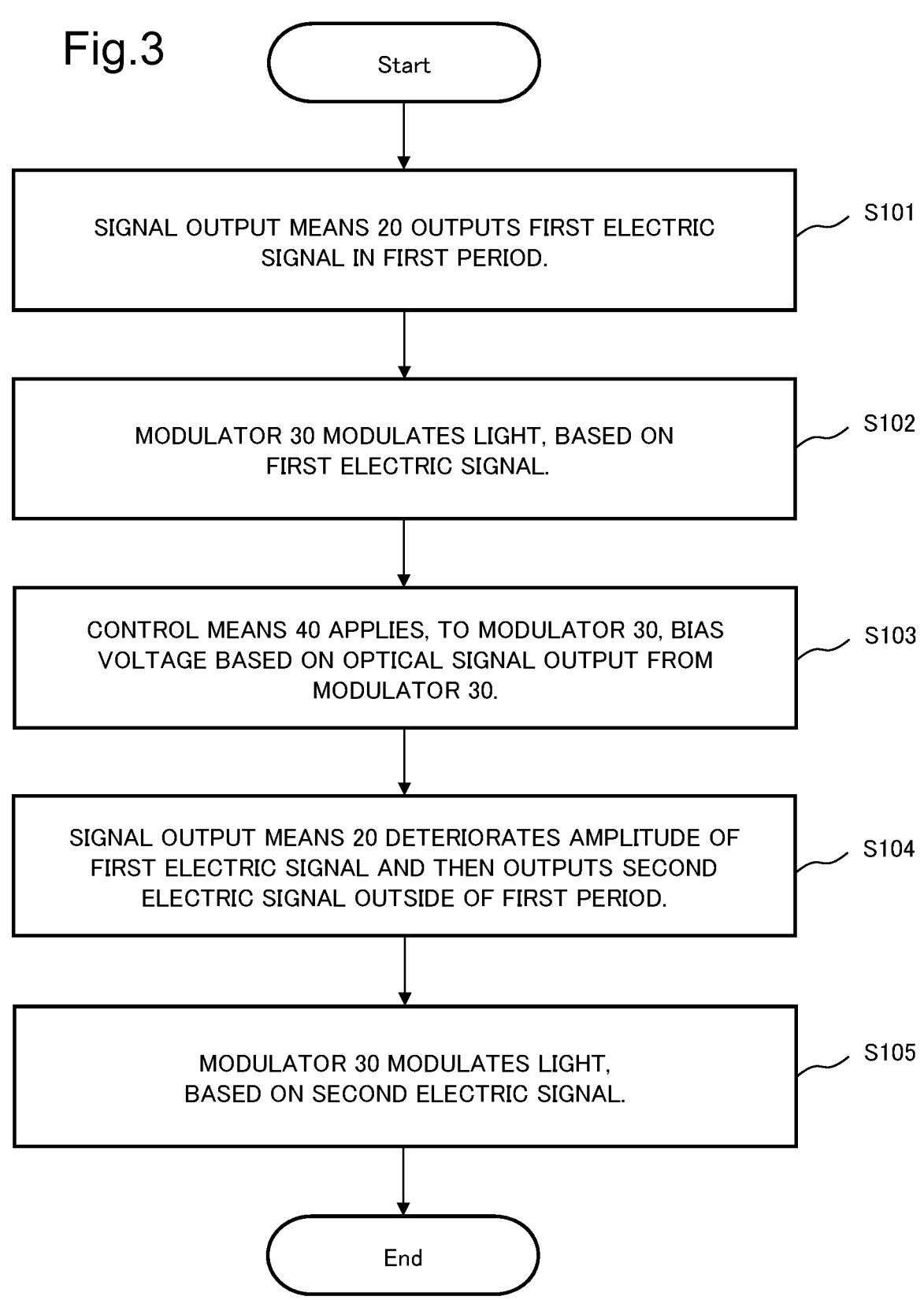

Fig.3

Start

SIGNAL OUTPUT MEANS 20 OUTPUTS FIRST ELECTRIC SIGNAL IN FIRST PERIOD.     S101

MODULATOR 30 MODULATES LIGHT, BASED ON FIRST ELECTRIC SIGNAL.     S102

CONTROL MEANS 40 APPLIES, TO MODULATOR 30, BIAS VOLTAGE BASED ON OPTICAL SIGNAL OUTPUT FROM MODULATOR 30.     S103

SIGNAL OUTPUT MEANS 20 DETERIORATES AMPLITUDE OF FIRST ELECTRIC SIGNAL AND THEN OUTPUTS SECOND ELECTRIC SIGNAL OUTSIDE OF FIRST PERIOD.     S104

MODULATOR 30 MODULATES LIGHT, BASED ON SECOND ELECTRIC SIGNAL.     S105

End

OPTICAL OUTPUT DEVICE 2

LIGHT BLOCKING MEANS CONTROL CIRCUIT    70

SIGNAL GENERATION MEANS    20

OPTICAL OUTPUT MEANS    10

MODULATOR    30

CONTROL MEANS    40

SPLIT MEANS    50

LIGHT BLOCKING MEANS    60

LIDAR DEVICE, LIDAR SYSTEM, AND MEASUREMENT METHOD USING LIDAR

This application is a National Stage Entry of PCT/JP2019/042888 filed on Oct. 31, 2019, the contents of all of which are incorporated herein by reference, in their entirety.

TECHNICAL FIELD

The present invention relates to a LiDAR device, a LiDAR system, and a measurement method by LiDAR that are capable of suppressing deterioration of signal quality of an optical signal.

BACKGROUND ART

A modulator being used in optical communication modulates, based on an input modulation signal, light being input from a light source. Thereby, the modulator outputs an optical signal having a characteristic according to the modulation signal. A technique relating to such a modulator is disclosed in PTLs 1 and 2 below.

Meanwhile, in a modulator, an extinction ratio of output from the modulator deteriorates due to, for example, operating point fluctuation resulting from degradation over time or the like. In order to suppress deterioration or the like of an extinction ratio, an operating point is controlled in such a way as to be kept at an appropriate position, by changing bias voltage.

The above-described bias voltage is derived from an optical signal being output from the modulator. For example, there is known a method of fetching a low-frequency signal extracted from an optical signal modulated by a modulation signal on which a low-frequency voltage signal (hereinafter, referred to as a "dither signal") is superimposed, and adjusting the bias voltage, based on the fetched signal.

CITATION LIST

Patent Literature

[PTL 1] International Publication No. WO2019/116549
[PTL 2] Japanese Unexamined Patent Application Publication (Translation of PCT Application) No. 2014-531779

SUMMARY OF INVENTION

Technical Problem

For example, in a technique of measuring a distance up to a target or the like by an optical signal (light detection and ranging, laser imaging detection and ranging (LiDAR)), a distance up to a target or the like is measured by outputting an optical signal, and receiving an optical signal (reflected light) reflected by the target.

Meanwhile, when a dither signal is superimposed on a modulation signal as described above, an intensity level in an optical signal modulated by a modulation signal fluctuates due to modulation by a dither signal. In other words, quality of an optical signal being output from a modulator deteriorates due to an influence of the dither signal.

Particularly, in an application such as LiDAR, slight reflected light returning from a target of distance measurement needs to be received. Thus, using an optical signal with quality that has deteriorated due to an influence of a dither signal has a problem that a rangeable distance shortens, or accuracy degradation of distance measurement is caused.

The present invention has been made in view of the above-described problem, and an object of the present invention is to provide a LiDAR device being capable of suppressing deterioration of signal quality of an optical signal.

Solution to Problem

A LiDAR device according to the present invention includes:

a signal output means for outputting a first electric signal in a first period, and deteriorating amplitude of the first electric signal and then outputting a second electric signal outside of the first period;

a modulator that outputs an optical signal modulated based on the first electric signal or the second electric signal; and a control means for applying, to the modulator, bias voltage based on the optical signal modulated based on the first electric signal.

A LiDAR system according to the present invention includes:

a signal output means for outputting a first electric signal in a first period, and deteriorating amplitude of the first electric signal and then outputting a second electric signal outside of the first period;

a modulator that outputs an optical signal modulated based on the first electric signal or the second electric signal; and a control means for applying, to the modulator, bias voltage based on the optical signal modulated based on the first electric signal.

A measurement method by LiDAR according to the present invention includes:

outputting a first electric signal in a first period;

outputting an optical signal modulated by a modulator, based on the first electric signal;

applying, to the modulator, bias voltage based on the optical signal modulated based on the first electric signal;

deteriorating amplitude of the first electric signal and then outputting a second electric signal outside of the first period; and outputting an optical signal modulated by the modulator, based on the second electric signal.

Advantageous Effects of Invention

The present invention is able to suppress deterioration of signal quality of an optical signal.

BRIEF DESCRIPTION OF DRAWINGS

FIG. 3 is a flowchart illustrating an operation example of the optical output device according to the first example embodiment of the present invention.

EXAMPLE EMBODIMENT

First Example Embodiment

Figure 1:
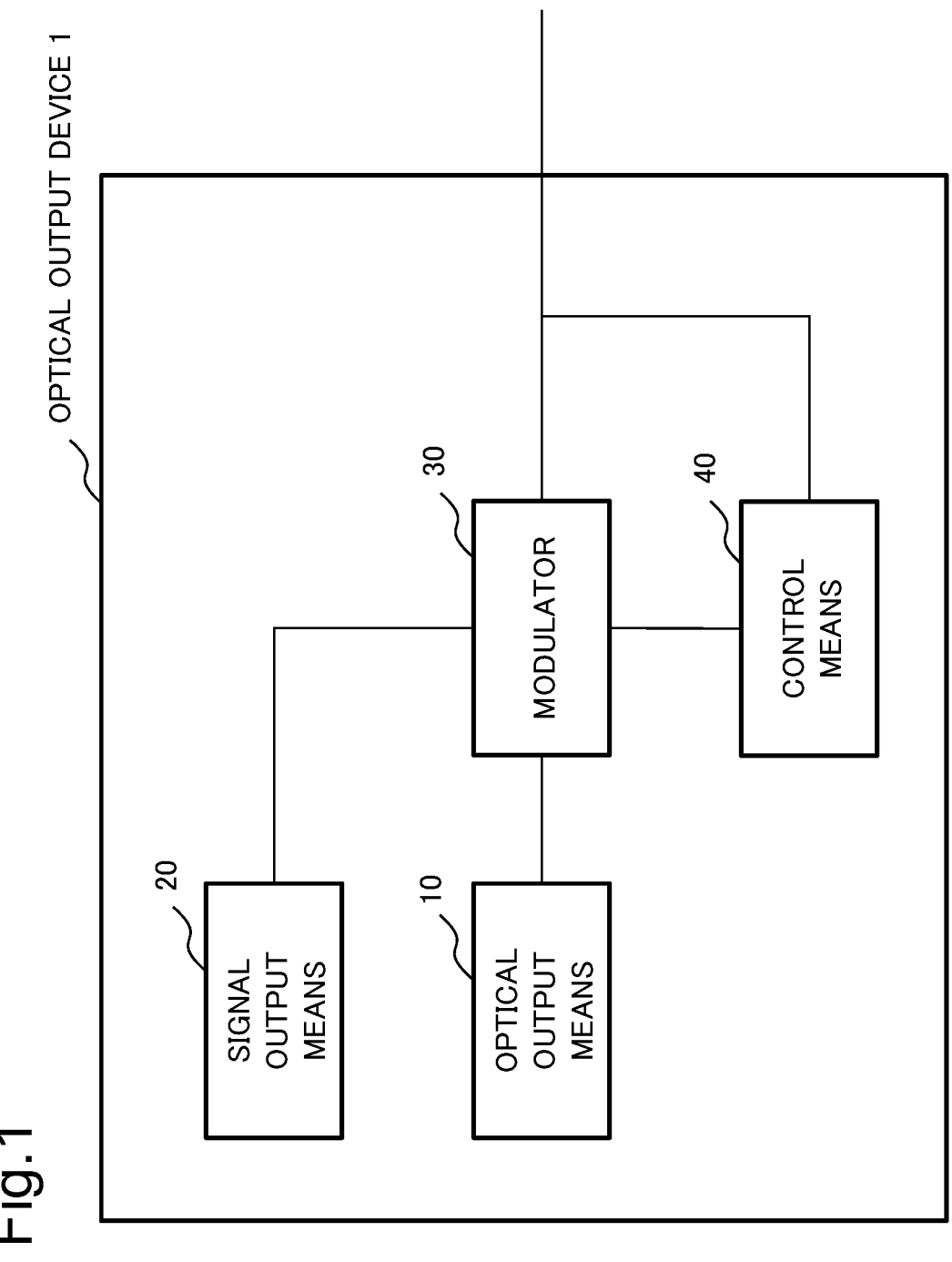
FIG. 1 is a block diagram illustrating a configuration example of an optical output device according to a first example embodiment of the present invention.
Figure 2:
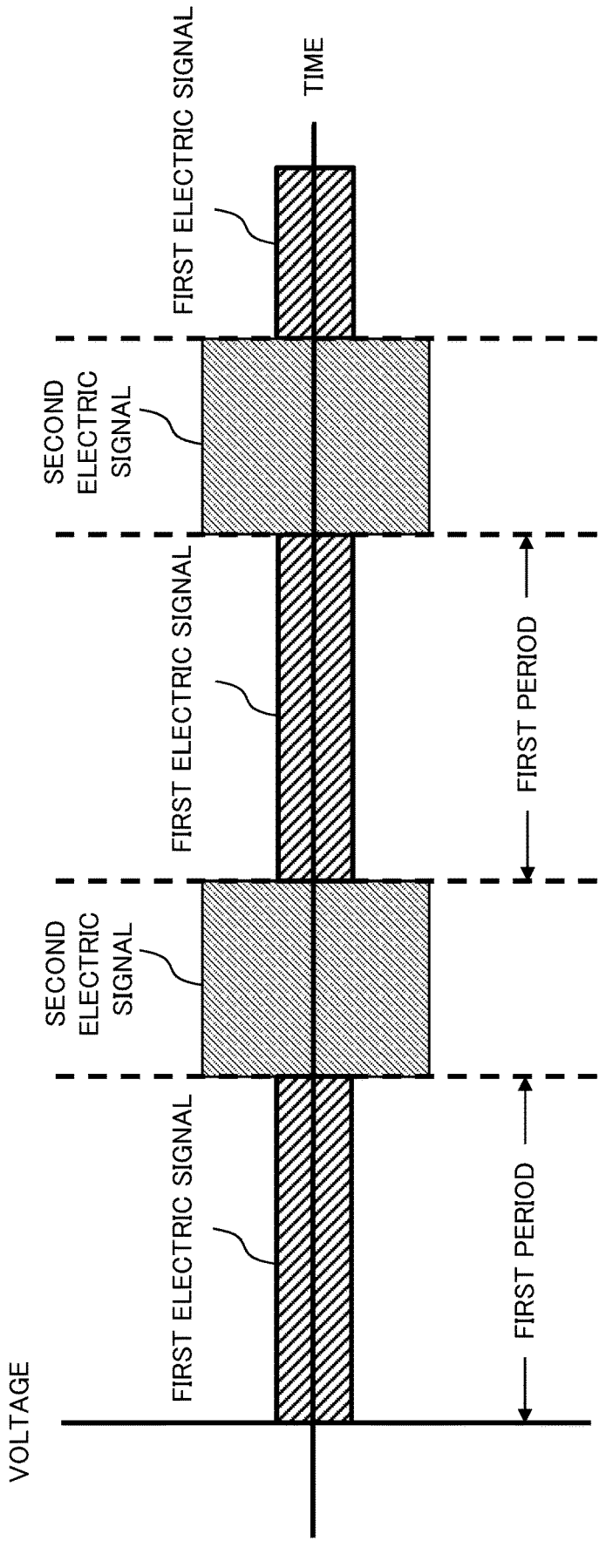
FIG. 2 is a diagram for describing one example of the optical output device according to the first example embodiment of the present invention.

An optical output device 1 according to a first example embodiment is described based on FIGS. 1, 2, and 3. FIG. 1 is a block diagram illustrating a configuration example of the optical output device 1. The optical output device 1 is, for example, a LiDAR device. FIG. 2 is a diagram for describing a signal output means 20 described later. FIG. 3 is a flowchart illustrating an operation example of the optical output device 1.

The optical output device 1 according to the first example embodiment is described. As illustrated in FIG. 1, the optical output device 1 includes an optical output means 10, the signal output means 20, a modulator 30, and a control means 40.

The optical output means 10 is described. The optical output means 10 outputs light of any wavelength. For example, the optical output means 10 is a laser diode. The light output by the optical output means 10 is input to the modulator 30.

The signal output means 20 is described. The signal output means 20 outputs an electric signal having a predetermined waveform and a predetermined frequency. The electric signal output from the signal output means 20 is input to the modulator 30. The signal output means 20 is, for example, large-scale integration (LSI). As illustrated in FIG. 2, the signal output means 20 outputs a first electric signal in a first period. The signal output means 20 outputs a second electric signal outside of the first period. Outside of the first period, the signal output means 20 deteriorates amplitude of the first electric signal more than amplitude of the first electric signal output in the first period. In this instance, it is preferable that the signal output means 20 does not output the first electric signal outside of the first period.

The control means 40 described later adjusts bias voltage, based on an optical signal modulated by the first electric signal. Thus, it is preferable that the first period has a length sufficient for the control means 40 to adjust bias voltage. The first electric signal is, for example, a dither signal. The second electric signal is, for example, a modulation signal.

Although FIG. 2 illustrates that the second electric signal is output in all of outside of the first period, the second electric signal may be output in part of outside of the first period. The signal output means 20 may output the second electric signal outside of and in the first period. As illustrated in FIG. 2, it is preferable that amplitude of the first electric signal output is smaller than amplitude of the second electric signal.

The modulator 30 is described. The modulator 30 modulates light from the optical output means 10 according to the first electric signal and the second electric signal from the signal output means 20, and outputs an optical signal. The modulator 30 is controlled according to bias voltage from the control means 40. The modulator 30 performs phase modulation, frequency modulation, or intensity modulation on light output from the optical output means 10. Thereby, when reflected by a target and received, an optical signal output from the modulator 30 can be coherently detected by interfering with reference light from the optical output means 10. The modulator 30 is, for example, a Mach-Zehnder modulator.

The control means 40 is described. An optical signal from the modulator 30 is input to the control means 40 from a non-illustrated optical coupler that splits the optical signal from the modulator 30. In this instance, the control means 40 can extract, via a photoelectric converter and a low-pass filter that are included therein, only a component of the first electric signal out of an optical signal output from the modulator 30, by deteriorating a frequency of the first electric signal more than a frequency of the second electric signal. Then, the control means 40 adjusts bias voltage in such a way that the component of the first electric signal becomes small, and applies adjusted bias voltage to the modulator 30. As described above, the control means 40 applies, to the modulator 30, bias voltage based on an optical signal modulated based on the first electric signal.

Next, an operation of the optical output device 1 is described by use of FIG. 3.

The signal output means 20 outputs a first electric signal in a first period (S101).

The modulator 30 modulates light, based on the first electric signal, and outputs an optical signal (S102).

The control means 40 applies, to the modulator 30, bias voltage based on the optical signal output from the modulator 30 (S103). Specifically, adjusted bias voltage is applied to the modulator 30, according to a method described in detail in the description of the control means 40.

The signal output means 20 deteriorates amplitude of the first electric signal and then outputs a second electric signal outside of the first period (S104). In this instance, it is preferable that the signal output means 20 does not output the first electric signal.

The modulator 30 modulates light, based on the second electric signal, and outputs an optical signal (S105). In this instance, the control means 40 applies, to the modulator 30, bias voltage of the same value as the bias voltage applied to the modulator 30 in S103.

The operation example of the optical output device 1 has been described above. When the signal output means 20 again outputs a first electric signal, the optical output device 1 performs processing in S101 to S105.

In this way, in the optical output device 1, the signal output means 20 outputs a first electric signal (dither signal) in a first period, and deteriorates amplitude of the first electric signal and then outputs a second electric signal (modulation signal) outside of the first period. The modulator 30 outputs an optical signal modulated based on the first electric signal (dither signal) and the second electric signal (modulation signal). The control means 40 applies, to the modulator 30, bias voltage based on the optical signal modulated based on the first electric signal (dither signal).

In this way, in the optical output device 1 according to the present example embodiment, amplitude of a first electric signal (dither signal) deteriorates when a second electric signal (modulation signal) is input to the modulator 30.

Therefore, as compared with a case where amplitude of a first electric signal (dither signal) does not deteriorate, the modulator 30 can suppress fluctuation of an intensity level in an optical signal according to a second electric signal (modulation signal). In other words, the optical output device 1 according to the present example embodiment is capable of suppressing deterioration of signal quality of an optical signal. The optical output device 1 can inhibit not only intensity level fluctuation but also an influence by a dither signal, such as phase fluctuation and frequency fluctuation.

For example, in a time of flight (ToF) technique related to a LiDAR technique, a distance up to a target or the like is measured, based on a time from output of an optical signal modulated by a modulation signal up to reception of an optical signal (reflected light) reflected by a target or the like. Thus, it is preferable that a timing of receiving reflected light is correctly detected. On the other hand, when an optical signal is subjected to not only modulation by a second electric signal (modulation signal) but also modulation by a first electric signal (dither signal) at output of the optical signal, the optical signal is output in a state where an intensity level fluctuates due to the first electric signal (dither signal). In this way, when an optical signal is output in a state where an intensity level fluctuates, it becomes difficult to correctly detect a timing of receiving a part of reflected light in which an intensity level is decreased.

A reflected optical signal is damped by propagation within a free space, scattering in a target, and the like. When an optical signal is greatly damped, a timing of receiving a signal may not be detected due to fluctuation of an intensity level of an optical signal at transmission. In this way, since a characteristic (shape or the like) of a ranging target and a ranging environment (distance up to a target or the like) are unknown, it is preferable, in a LiDAR technique, to suppress fluctuation of an intensity level.

In contrast, the optical output device 1 according to the present example embodiment can suppress fluctuation of an intensity level of an optical signal by deteriorating amplitude of a first electric signal (dither signal) when a second electric signal (modulation signal) is input to the modulator 30. In other words, the optical output device 1 according to the present example embodiment can output a high-quality optical signal.

Figure 4:
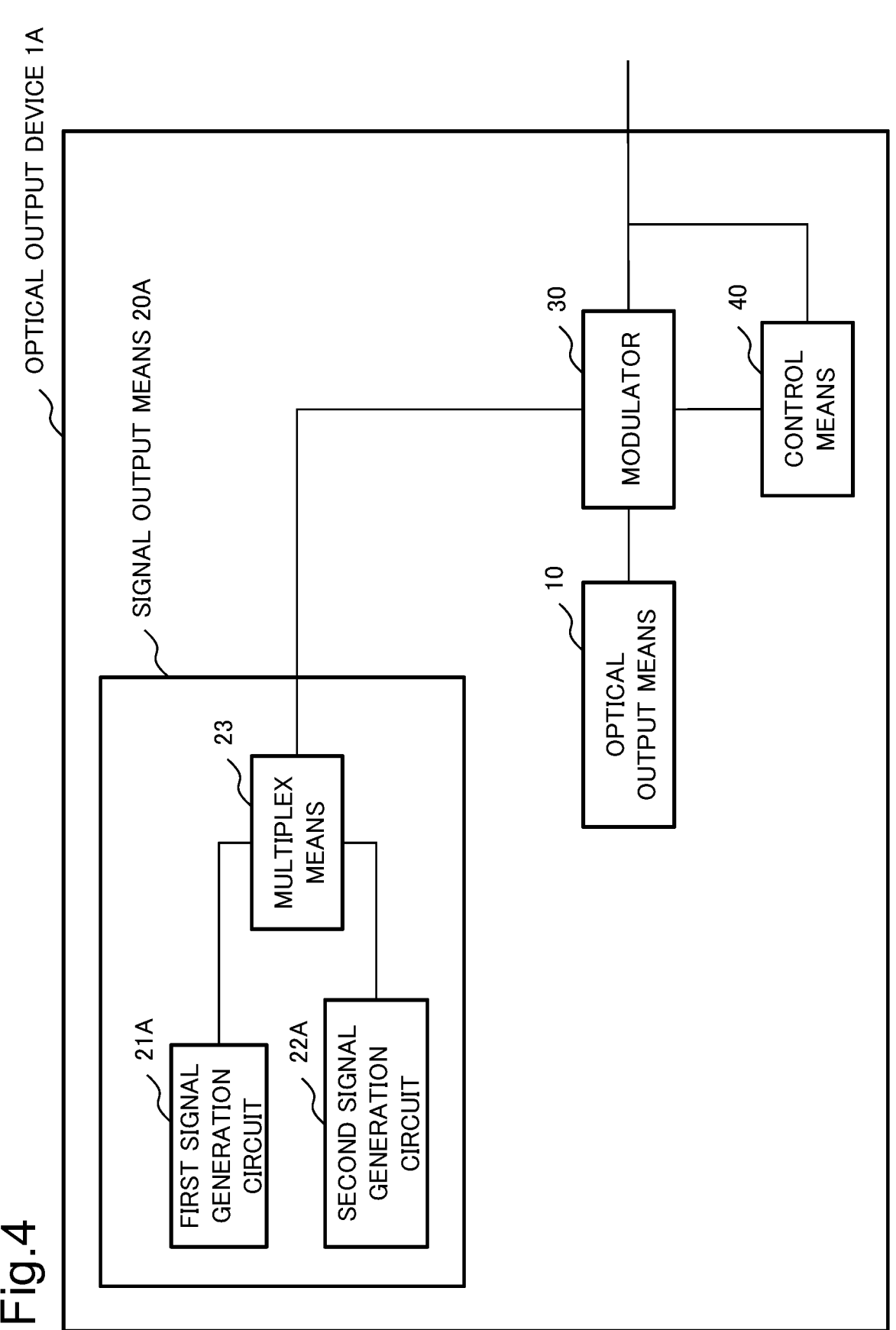
FIG. 4 is a block diagram illustrating a configuration example of a modified example of the optical output device according to the first example embodiment of the present invention.
Figure 5:
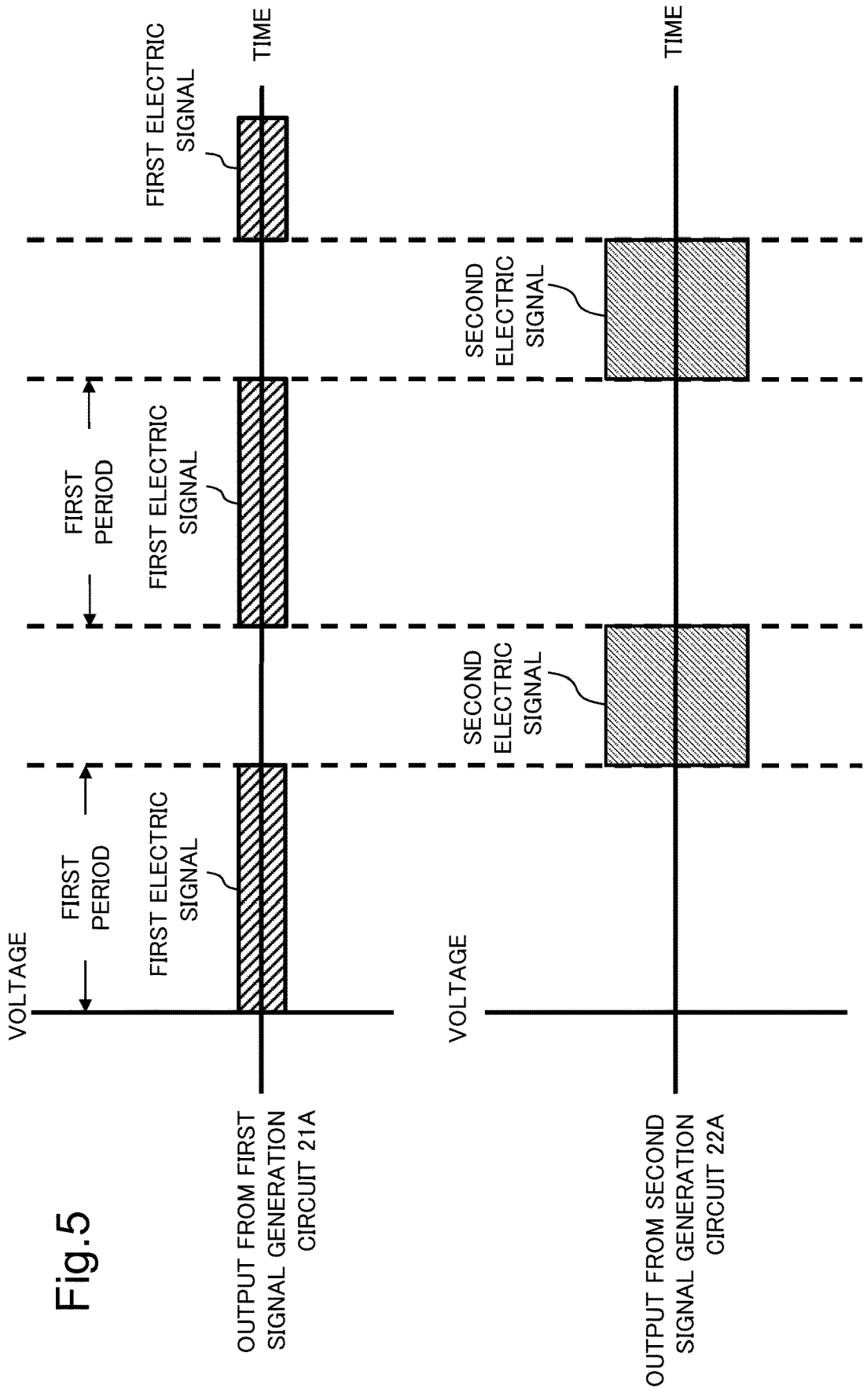
FIG. 5 is a diagram for describing a first modified example of the optical output device according to the first example embodiment of the present invention.

Next, an optical output device 1A is described by use of FIGS. 1, 4, and 5. The optical output device 1A is a first modified example of the optical output device 1. The optical output device 1A is, for example, a LiDAR device. As illustrated in FIG. 4, the optical output device 1A includes an optical output means 10, a modulator 30, and a control means 40, as in the optical output device 1. The optical output device 1A includes a signal output means 20A instead of the signal output means 20.

As illustrated in FIG. 4, the signal output means 20A includes a first signal generation circuit 21A, a second signal generation circuit 22A, and a multiplex means 23.

The first signal generation circuit 21A outputs a first electric signal in a first period. Specifically, as illustrated in FIG. 5, the first signal generation circuit 21A outputs the first electric signal with a predetermined time interval. Outside of the first period, the first signal generation circuit 21A deteriorates amplitude of the first electric signal more than the first electric signal in the first period. It is preferable that the first signal generation circuit 21A does not output the first electric signal outside of the first period. FIG. 5 illustrates a case where the first electric signal is not output outside of the first period. The first signal generation circuit 21A is connected to the multiplex means 23. The first signal generation circuit 21A is, for example, LSI.

The second signal generation circuit 22A outputs a second electric signal outside of the first period. Specifically, as illustrated in FIG. 5, the second signal generation circuit 22A outputs the second electric signal with a first period interval. Although FIG. 5 illustrates that the second signal generation circuit 22A outputs the second electric signal in all of outside of the first period, the second signal generation circuit 22A may output the second electric signal in part of outside of the first period. The second signal generation circuit 22A may output the second electric signal outside of and in the first period. The second signal generation circuit 22A is connected to the multiplex means 23. The second signal generation circuit 22A is, for example, LSI.

The multiplex means 23 multiplexes and outputs, to the modulator 30, the first electric signal from the first signal generation circuit 21A and the second electric signal from the second signal generation circuit 22A. The multiplex means 23 is, for example, an adder.

Instead of providing the multiplex means 23 in the signal output means 20A, the multiplex means 23 may be provided in the modulator 30. In this case, the first electric signal from the first signal generation circuit 21A and the second electric signal from the second signal generation circuit 22A are multiplexed by the multiplex means 23 included in the modulator 30.

An operation of the optical output device 1A is similar to an operation of the optical output device 1 illustrated in FIG. 3.

Figure 6:
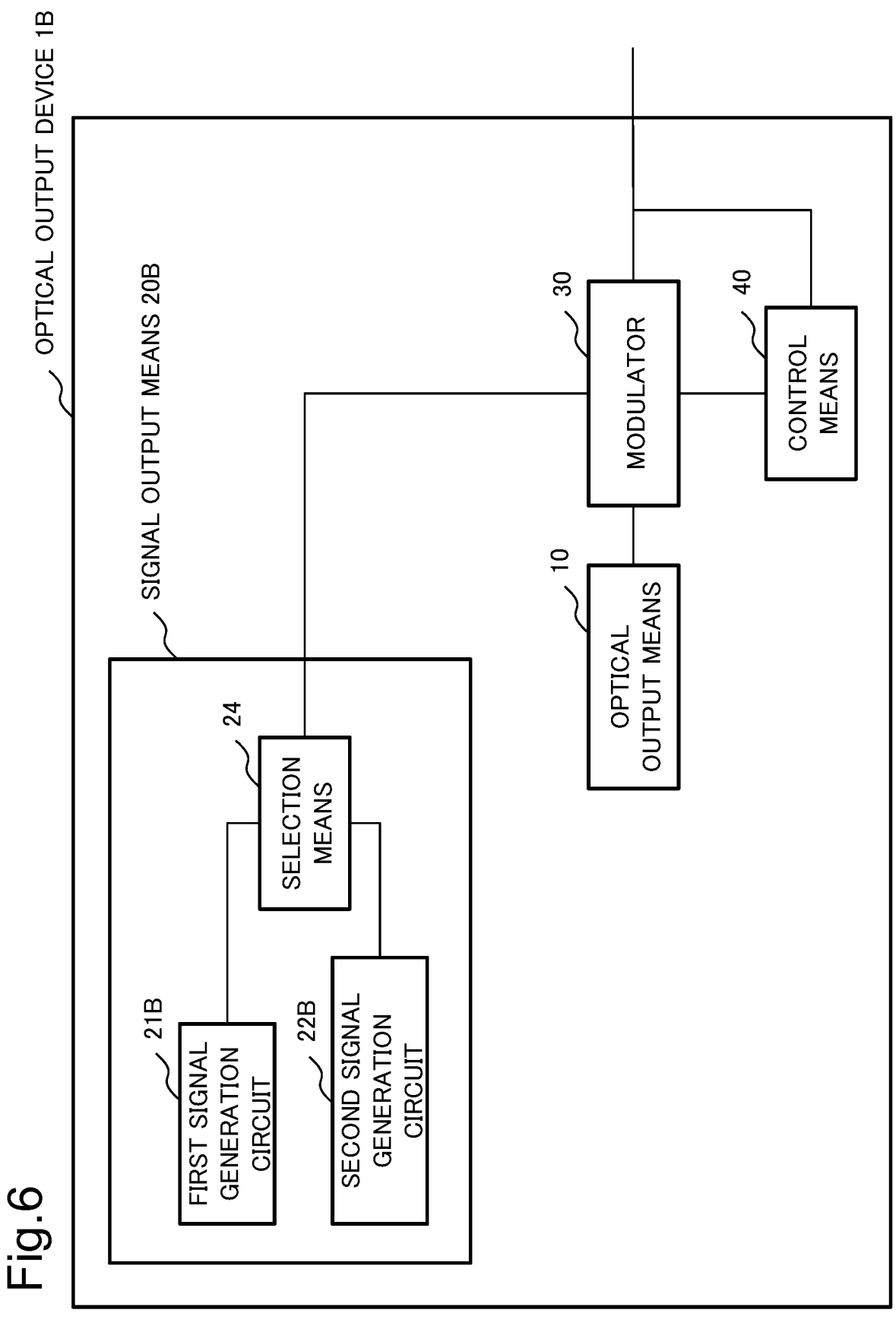
FIG. 6 is a block diagram illustrating a configuration example of a second modified example of the optical output device according to the first example embodiment of the present invention.
Figure 7:
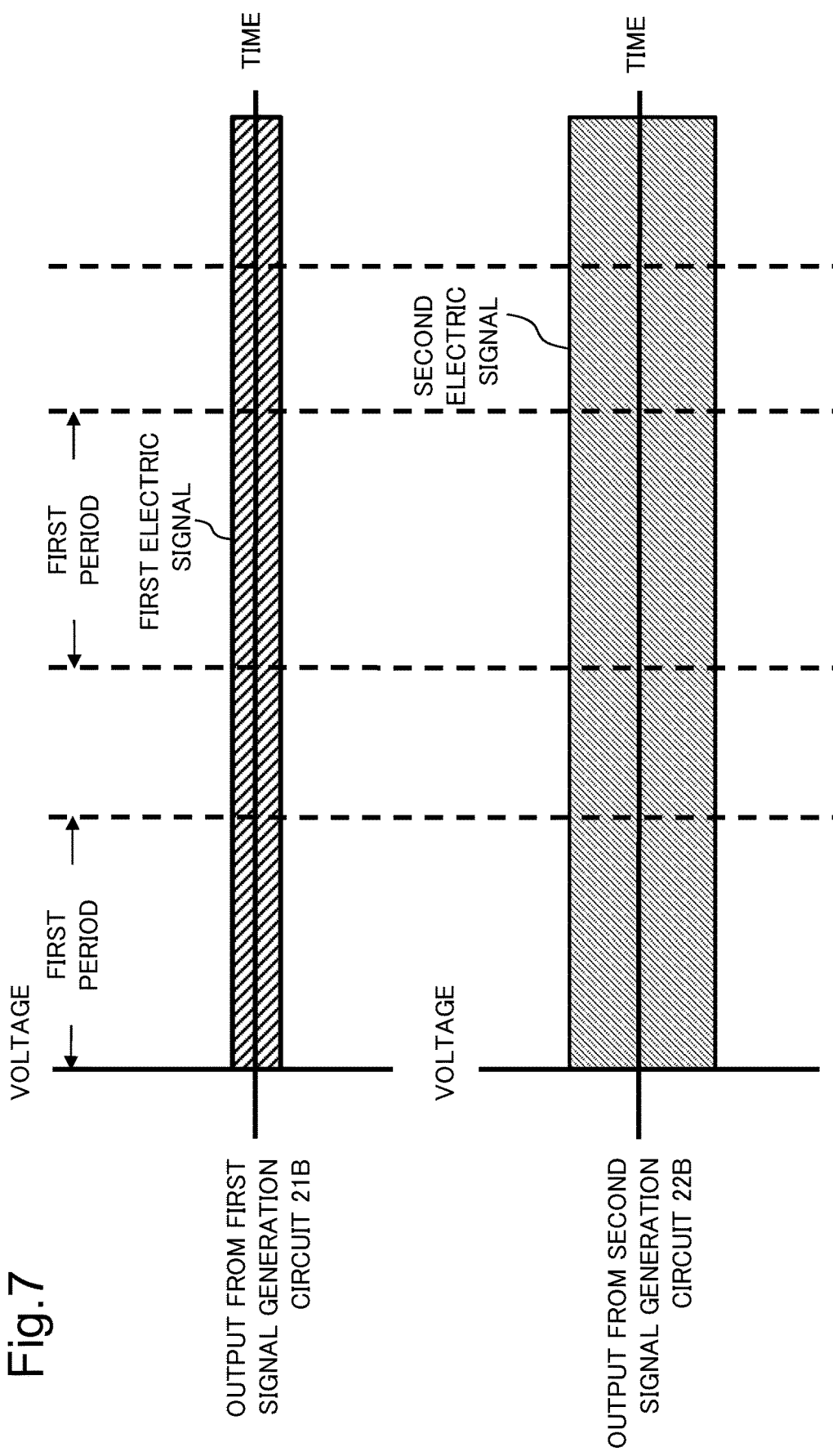
FIG. 7 is a diagram for describing the second modified example of the optical output device according to the first example embodiment of the present invention.

Next, an optical output device 1B is described by use of FIGS. 1, 6, and 7. The optical output device 1B is a second modified example of the optical output device 1. The optical output device 1B is, for example, a LiDAR device. As illustrated in FIG. 6, the optical output device 1B includes an optical output means 10, a modulator 30, and a control means 40, as in the optical output device 1. The optical output device 1B includes a signal output means 20B instead of the signal output means 20.

As illustrated in FIG. 6, the signal output means 20B includes a first signal generation circuit 21B, a second signal generation circuit 22B, and a selection means 24.

The first signal generation circuit 21B continuously outputs a first electric signal. Specifically, as illustrated in FIG. 7, the first signal generation circuit 21B constantly outputs the first electric signal. The first signal generation circuit 21B is connected to the selection means 24. The first signal generation circuit 21B is, for example, LSI.

The second signal generation circuit 22B continuously outputs a second electric signal. Specifically, as illustrated in FIG. 7, the second signal generation circuit 22B constantly outputs the second electric signal. The second signal generation circuit 22B is connected to the selection means 24. The second signal generation circuit 22B is, for example, LSI.

The selection means 24 outputs, to the modulator 30, one of the first electric signal from the first signal generation circuit 21B and the second electric signal from the second signal generation circuit 22B. Specifically, the selection means 24 outputs, to the modulator 30, the first electric signal from the first signal generation circuit 21B in the first period. The selection means 24 outputs, to the modulator 30, an electric signal from the second signal generation circuit 22B outside of the first period.

Instead of providing the selection means 24 in the signal output means 20B, the selection means 24 may be provided in the modulator 30. In this case, the modulator 30 selects, by the selection means 24, one of the first electric signal from the first signal generation circuit 21B and the second electric signal from the second signal generation circuit 22B. Then, the modulator 30 modulates light from the optical output means 10, based on the selected electric signal.

An operation of the optical output device 1B is similar to an operation of the optical output device 1 illustrated in FIG. 3.

Second Example Embodiment

Figure 8:
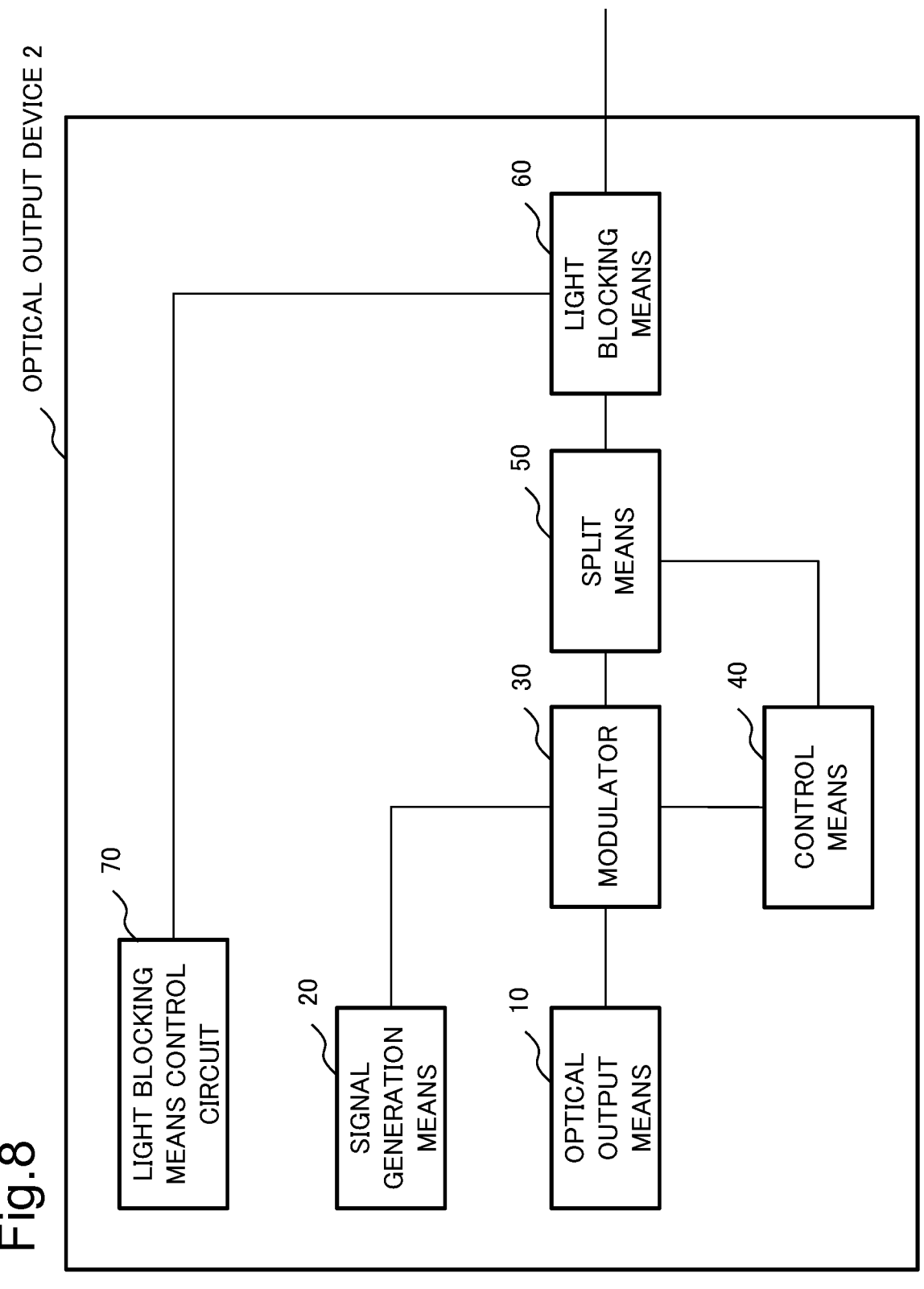
FIG. 8 is a block diagram illustrating a configuration example of an optical output device according to a second example embodiment of the present invention.
Figure 9:
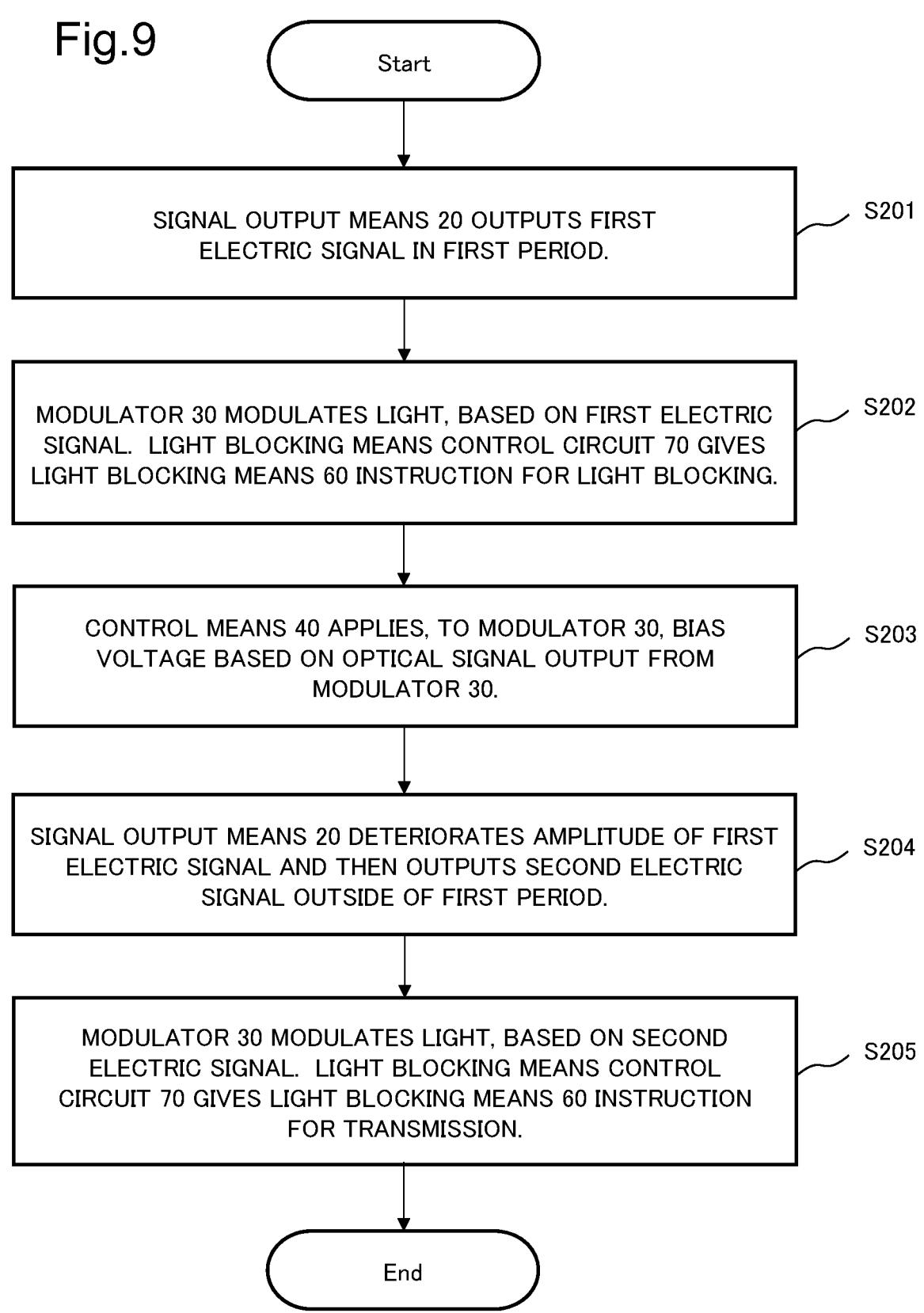
FIG. 9 is a flowchart illustrating an operation example of the optical output device according to the second example embodiment of the present invention.

An optical output device 2 according to a second example embodiment of the present invention is output based on FIGS. 8 and 9. The optical output device 2 is, for example, a LiDAR device. FIG. 8 is a block diagram illustrating a configuration example of the optical output device 2. FIG. 9 is a flowchart illustrating an operation example of the optical output device 2.

The optical output device 2 includes an optical output means 10, a signal output means 20, a modulator 30, and a control means 40, as in the optical output device 1. The optical output device 2 further includes a split means 50, a light blocking means 60, and a light blocking means control circuit 70.

The split means 50 splits an optical signal output from the modulator 30, and outputs split optical signals to the control means 40 and the light blocking means 60. The split means 50 is, for example, an optical coupler.

The light blocking means 60 blocks an optical signal modulated based on a first electric signal, and transmits an optical signal modulated based on a second electric signal. The light blocking means 60 blocks an optical signal according to an instruction from the light blocking means control circuit 70. The light blocking means 60 is, for example, an optical shutter. The light blocking means 60 may be an acoustooptical modulator or may be a semiconductor optical amplifier.

The light blocking means control circuit 70 instructs the light blocking means 60 on timings of blocking and transmitting an optical signal from the split means 50. Specifically, the light blocking means control circuit 70 instructs the light blocking means 60 to block an optical signal in a first period. The light blocking means control circuit 70 instructs the light blocking means 60 to transmit an optical signal outside of the first period.

Next, an operation of the optical output device 2 is described by use of FIG. 9. Processing in each of S201, S203, and S204 in a flowchart illustrated in FIG. 9 is similar to processing in each of S101, S103, and S104 in a flowchart illustrating the operation of the optical output device 1, and, therefore, description thereof is omitted.

In the processing of S202 illustrated in FIG. 9, the modulator 30 modulates light, based on the first electric signal, as in the processing of S102. In the processing of S202, the light blocking means control circuit 70 further gives the light blocking means 60 an instruction for light blocking. Thereby, the light blocking means 60 light-blocks an optical signal from the modulator 30.

In the processing of S205 illustrated in FIG. 9, the modulator 30 modulates light, based on the second electric signal, as in the processing of S105. In the processing of S205, the light blocking means control circuit 70 further gives the light blocking means 60 an instruction for transmission. Thereby, the light blocking means 60 transmits an optical signal from the modulator 30.

The operation example of the optical output device 2 has been described above.

In this way, the optical output device 2 includes, in addition to a component added by the optical output device 1, the light blocking means 60 that blocks an optical signal modulated based on the first electric signal (dither signal), and transmits an optical signal modulated based on the second electric signal (modulation signal).

Thereby, the optical output device 2 can suppress output of an optical signal modulated based on the first electric signal (dither signal). For example, in a ToF technique, a timing of receiving reflected light of an optical signal modulated by the second electric signal (modulation signal) is detected based on intensity of received light. In this instance, when an optical signal modulated based on the first electric signal (dither signal) is output from the optical output device 2, reflected light also includes reflected light of an optical signal modulated based on the first electric signal (dither signal). This case has such a negative influence that reception of reflected light of an optical signal modulated based on the second electric signal (modulation signal) is erroneously detected by reflected light of an optical signal modulated based on the first electric signal (dither signal).

Thus, as in the optical output device 2 according to the present example embodiment, a reception timing of reflected light of an optical signal modulated based on the second electric signal (modulation signal) can be correctly detected by suppressing output of an optical signal modulated based on the first electric signal (dither signal).

In the optical output device 2, when an optical amplifier is provided at a subsequent stage of the light blocking means 60, an optical signal modulated based on the second electric signal (modulation signal) can be efficiently amplified by suppressing output of an optical signal modulated based on the first electric signal (dither signal).

The light blocking means 60 is an acoustooptical modulator or an optical amplifier. Generally, in an acoustooptical modulator or an optical amplifier, bias control using a dither signal does not need to be performed. Thus, the optical output device 2 according to the present example embodiment can accurately output an optical signal according to the second electric signal (modulation signal), as compared with a case where an LN modulator or the like is used for the light blocking means 60.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

1, 1A, 2 Optical output device
10 Optical output means
20, 20A, 20B Signal output means
21A, 21B First signal generation circuit
22A, 22B Second signal generation circuit
23 Multiplex means
24 Selection means
30 Modulator
40 Control means
50 Split means
60 Light blocking means
70 Light blocking means control circuit

9

10

What is claimed is:

1. A LIDAR device comprising:

a signal outputter configured to output a first electric signal in a first period, and deteriorate amplitude of the first electric signal and then output a second electric signal outside of the first period;

a modulator configured to output an optical signal modulated based on the first electric signal or the second electric signal;

a controller configured to apply, to the modulator, bias voltage based on the optical signal modulated based on the first electric signal; and a light blocker configured to block the optical signal modulated based on the first electric signal, and transmit the optical signal modulated based on the second electric signal.

2. The LiDAR device according to claim 1, wherein the signal outputter does not output the first electric signal, and outputs the second electric signal, outside of the first period.

3. The LiDAR device according to claim 1, wherein the signal outputter includes:

a first signal generator configured to generate the first electric signal in the first period;

a second signal generator configured to generate the second electric signal outside of the first period; and a multiplexer configured to multiplex and output the first electric signal from the first signal generator and the second electric signal from the second signal generator.

4. The LiDAR device according to claim 1, wherein the signal outputter includes:

a first signal generator configured to generate the first electric signal;

a second signal generator configured to generate the second electric signal; and a selector configured to select the first electric signal from the first signal generator in the first period, and output the second electric signal from the second signal generator outside of the first period.

5. The LiDAR device according to claim 1, wherein the light blocker is an acousto-optical modulator or an optical amplifier.

6. The LiDAR device according to claim 1, wherein the modulator outputs a phase-modulated or frequency-modulated optical signal, based on the first electric signal and the second electric signal.

7. A LiDAR system comprising:

a signal outputter configured to output a first electric signal in a first period, and deteriorate amplitude of the first electric signal and then output a second electric signal outside of the first period;

a modulator configured to output an optical signal modulated based on the first electric signal or the second electric signal;

a controller configured to control, to the modulator, bias voltage based on the optical signal modulated based on the first electric signal; and a light blocker configured to block the optical signal modulated based on the first electric signal, and transmit the optical signal modulated based on the second electric signal.

8. A measurement method by LiDAR, comprising:

outputting a first electric signal in a first period;

outputting an optical signal modulated by a modulator, based on the first electric signal;

applying, to the modulator, bias voltage based on the optical signal modulated based on the first electric signal;

deteriorating amplitude of the first electric signal and then outputting a second electric signal outside of the first period;

outputting an optical signal modulated by the modulator, based on the second electric signal;

blocking the optical signal modulated based on the first electric signal; and transmitting the optical signal modulated based on the second electric signal.

* * * * *